(12) United States Patent
Liu et al.

(10) Patent No.: US 10,386,270 B2
(45) Date of Patent: Aug. 20, 2019

(54) METHOD FOR SIMULATING REAL IMPACT TEST OF VEHICLE WHEELS

(71) Applicant: CITIC Dicastal CO., LTD, Qinhuangdao (CN)

(72) Inventors: Chunhai Liu, Qinhuangdao (CN); Qiang Liu, Qinhuangdao (CN); Shide Li, Qinhuangdao (CN); Zhigao Yin, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 286 days.

(21) Appl. No.: 15/417,681

(22) Filed: Jan. 27, 2017

(65) Prior Publication Data

US 2017/0219459 A1    Aug. 3, 2017

(30) Foreign Application Priority Data

Jan. 31, 2016 (CN) .......................... 2016 1 0064769

(51) Int. Cl.
  *G01M 17/007*  (2006.01)
  *G01M 17/013*  (2006.01)

(52) U.S. Cl.
  CPC ...... *G01M 17/013* (2013.01); *G01M 17/0078* (2013.01)

(58) Field of Classification Search
  CPC ..................... G01M 17/013; G01M 17/0078
  USPC .............................................. 73/12
  See application file for complete search history.

(56) References Cited

U.S. PATENT DOCUMENTS

| 4,502,327 | A  | * | 3/1985  | Scrivener | ............... | G01N 33/42 |
| | | | | | | 73/146 |
| 2006/0278026 | A1 | * | 12/2006 | Friedman  | ............ | G01M 17/007 |
| | | | | | | 73/865.6 |
| 2008/0307855 | A1 | * | 12/2008 | Friedman  | .......... | G01M 17/0074 |
| | | | | | | 73/12.09 |
| 2011/0048120 | A1 | * | 3/2011  | Dank      | .................. | G01M 17/022 |
| | | | | | | 73/146 |

(Continued)

OTHER PUBLICATIONS

Wheel Motor Shock Loading Experiments and RequirementsE.J. Triche, M.S. Worthington, J.H. Beno, J.R. Mock, and D. Lippert, "Wheel motor shock loading experiments and requirements," 5th International AECV Conference, Angers, France, Jun. 2-5, 2003. (Year: 2003).*

*Primary Examiner* — Natalie Huls
*Assistant Examiner* — Monica S Young
(74) *Attorney, Agent, or Firm* — Maier & Maier, PLLC (57) ABSTRACT

The invention provides a method for simulating real impact test of vehicle wheels, and the method is implemented using a system as follows: the system includes a vehicle used in wheel simulating real impact test, a road surface, a high-frequency lighting facility, a standard obstacle block, a high-speed camera, and a traction motor and steel cable. The method for simulating real impact test of vehicle wheels of the invention has the advantages that: the need for testing various types of wheels using one set of equipment can be satisfied by using a general type collision trolley, thereby avoiding the use of a corresponding real vehicle for each type of wheels in the test. This greatly reduces the test cost, ensures that the test condition is similar to the real vehicle condition, and can well simulate the performance of a real vehicle when meeting an obstacle.

17 Claims, 8 Drawing Sheets

(56) References Cited

U.S. PATENT DOCUMENTS

| | | | |
|---|---|---|---|
| 2011/0130862 A1* | 6/2011 | Gao | B66D 3/18 |
| | | | 700/213 |
| 2012/0260726 A1* | 10/2012 | Cuttino | G01M 17/021 |
| | | | 73/146 |
| 2013/0068006 A1* | 3/2013 | Cuttino | G01M 17/02 |
| | | | 73/118.01 |
| 2014/0090461 A1* | 4/2014 | Cuttino | G01M 17/021 |
| | | | 73/118.01 |
| 2015/0059458 A1* | 3/2015 | Lee | G01B 11/2755 |
| | | | 73/115.07 |
| 2017/0137023 A1* | 5/2017 | Anderson | B60G 17/0195 |

* cited by examiner

METHOD FOR SIMULATING REAL IMPACT TEST OF VEHICLE WHEELS

TECHNICAL FIELD

The invention relates to the field of automobile part simulation test and in particular to a method for simulating real impact test of vehicle wheels.

BACKGROUND ART

At present, in the simulating real impact test of vehicle wheels, the bench test method is usually utilized for the radial impact test and 13-degree impact test, etc., to evaluate response of the wheels under different collision conditions and judge whether the wheels confirm to the requirements of vehicle manufacturers and users.

The bench test is based on the simulation of the actual driving conditions; however, the simulation results may fail to fully reflect the real response to a variety of undesirable road surfaces during the actual travel process. In order to provide the quality of vehicles under traffic accident conditions, the vehicle manufacturers usually evaluate the performance of vehicles in traffic accidents by wall collision test of real vehicles. However, there is no testing method or device yet for the test of wheels and other vehicle parts under non-accident conditions.

SUMMARY OF THE INVENTION

For the simulating real impact test of wheels and other vehicle parts under non-accident conditions, the invention provides a method for simulating real impact test of wheels.

It is known for a person skilled in the prior art that a vehicle may meet bumps on a road surface during the travel process. The bumps may be raised parts on mud road surfaces, water pipes and mud shields for agricultural irrigation and pavement on village roads or township roads, deceleration strips laid around communities or schools or other bumps or obstacles existing on roads. The vehicle may meet indentations during the travel process, and the indentations may be recessed portions of mud, asphalt and concrete road surfaces, or road coating-type deceleration strips, etc. When a vehicle passes through one of the road surfaces mentioned above, the tires apply a certain effect on the wheels. This effect is then dispersed to the vehicle body via the axles and suspension system. As an auto part directly facing the impact effect, the wheels may be damaged in this travel event. As a wheel manufacturer, Dicastal Company hopes to perform wheel performance test under the conditions closest to the reality.

In one aspect of the invention, a method for simulating real impact test of vehicle wheels is provided, which is characterized in that the method is implemented using a system as follows: the system includes a vehicle used in wheel simulating real impact test, a road surface 3, a high-frequency lighting facility 4, a standard obstacle block 5, a high-speed camera 6, and a traction motor and steel cable 7; the traction motor of the traction motor and steel cable 7 is fixed to the first end of the road surface 3 and fixed to the first end of the steel cable, the other end of the steel cable is fixed to a traction hook adapting mechanism 104 of the vehicle used in wheel simulating real impact test; the foregoing vehicle used in wheel simulating real impact test is located at the first end of the road surface 3; the standard obstacle block 5 is fixed to the second end of the road surface 3; the high-speed camera 6 is mounted on the lateral side of the road surface 3 and above the standard obstacle block 5; the high-frequency lighting facility 4 is mounted above the standard obstacle block 5; the vehicle used in wheel simulating real impact test consists of a collision vehicle assembly 1 and a tested real vehicle wheel and suspension system 2, the collision vehicle assembly 1 includes a trolley body 101, a weight and fixation device 102, a rear wheel and axle assembly 103 and a traction hook adapting mechanism 104; the weight and fixation device 102 is disposed at the middle part of the trolley body 101, the tested real vehicle wheel and suspension system 2 is mounted at the front part of the trolley body 101, the rear wheel and axle assembly 103 is mounted at the rear part of the trolley body 101, and the traction hook adapting mechanism 104 is fixed at the bottom of the trolley body 101; and the method includes the following steps: (A) assembling a hub bearing 202, a steering knuckle 203, a damper and spring 204, a steering drag rod 205 and a control arm 206 to the real vehicle wheel and suspension system 2 under the assembly conditions of a real vehicle corresponding to a to-be-tested wheel tire 201, and fixing to the trolley body 101 via a suspension fixation backboard 207; (B) fixing weights at the front, middle and rear parts of the trolley body 101 according to the weight of the real vehicle corresponding to the to-be-tested wheel tire 201, to form the weight and fixation device 102; (C) performing front wheel alignment correction on the mounted vehicle used in wheel simulating real impact test, to ensure that the vehicle is driven by the traction motor and steel cable 7 to make linear movement; (D) moving the mounted vehicle used in wheel simulating real impact test to the first end of the road surface 3 and fixing to the traction motor and steel cable 7; (E) arranging the standard obstacle block 5 on the road surface 3; (F) turning on the high-frequency lighting facility 4 and the high-speed camera 6; (G) towing the vehicle used in wheel simulating real impact test using the traction motor and steel cable 7; (H) taking images by the high-speed camera when the vehicle passes through the obstacle block, and then decelerating to stop; (I) detecting the wheel deformation.

In a preferred aspect of the invention, the trolley body 101 is welded from square tube steel with a steel plate being disposed at the bottom.

In a preferred aspect of the invention, the weight and fixation device 102 includes weights fixed to the front, middle and rear parts of the trolley body 101, and the weights fixed to the front, middle and rear parts of the trolley body 101 are of 50-200 kg, 50-400 kg and 50-200 kg, respectively.

In a further preferred aspect of the invention, each weight in the weight and fixation device 102 is a cylinder of 400 mm diameter and 50 mm thickness, with a through-hole of 60 mm diameter at the middle; each weight is fixed to the trolley body 101 via a fixation rod, and the fixation rod is a M48 threaded rod of 500 mm length; and the bottom end of the fixation rod is threadedly fixed onto the bottom of the trolley body.

In a preferred aspect of the invention, the tested real vehicle wheel and suspension system 2 includes a tested wheel tire 201, a hub bearing 202, a steering knuckle 203, a damper and spring 204, a steering drag rod 205, a control arm 206 and a suspension fixation backboard 207; the tested wheel tire 201, the hub bearing 202, the steering knuckle 203, the damper and spring 204, the steering drag rod 205 and the control arm 206 are assembled in the real vehicle assembly mode; the control arm 206 and the damper and spring 204 are fixed to the suspension fixation backboard 207, respectively; and the suspension fixation backboard 207 is fixed to the trolley body 101.

In a further preferred aspect of the invention, the hub bearing 202, the steering knuckle 203, the damper and spring 204, the steering drag rod 205 and the control arm 206 are components for real vehicle assembly of the to-be-tested real vehicle wheel 201.

In a preferred aspect of the invention, in step (F), the traction enables the velocity of the vehicle used in wheel simulating real impact test to be 40-80 km/h.

In a further preferred aspect of the invention, the traction enables the velocity of the vehicle used in wheel simulating real impact test to be 64 kM/h, the tire used is of type 205/55R16, the tire pressure of the tire is 200 kPa, and in the case of full load, the front axle weight is 900 kg and the rear axle weight is 820 kg.

In a preferred aspect of the invention, the standard obstacle block 5 is a convex obstacle, consisting of a convex obstacle block 1, a tri-axial force sensor 2, a sensor pedestal 3 and a groove 5, and characterized in that the groove 5 is located on the road surface 4; the sensor pedestal 3 is mounted at the bottom of the groove 5; one end of the tri-axial force sensor 2 is mounted on the upper surface of the sensor pedestal 3 and the other end is mounted on the lower surface of the convex obstacle block 1; the upper portion of the cross section of the convex obstacle block 1 along the length direction of the groove 5 is a trapezoid; and, the convex obstacle block 1 is arranged such that the bottom side of the trapezoid is aligned with the road surface after mounting; and the convex obstacle block 1 is selected from one of: (A) the length of long bottom side and the length of short bottom side of the isosceles trapezoid portion of the cross section of the convex obstacle block 1 along the length direction of the groove 5 are 430 mm and 100 mm, respectively, the height of the trapezoid is 80 mm, and the lower portion of the cross section of the convex obstacle block 1 along the length direction of the groove 5 is a rectangle, and the dimension of the rectangle is 430×70 mm; (B) the length of long bottom side and the length of short bottom side of the isosceles trapezoid portion of the cross section of the convex obstacle block 1 along the length direction of the groove 5 are 400 mm and 80 mm, respectively, the height of the trapezoid is 50 mm, and the lower portion of the cross section of the convex obstacle block 1 along the length direction of the groove 5 is a rectangle, and the dimension of the rectangle is 400×50 mm; (C) the length of long bottom side and the length of short bottom side of the isosceles trapezoid portion of the cross section of the convex obstacle block 1 along the length direction of the groove 5 are 450 mm and 130 mm, respectively, the height of the trapezoid is 90 mm, and the lower portion of the cross section of the convex obstacle block 1 along the length direction of the groove 5 is a rectangle, and the dimension of the rectangle is 450×90 mm.

In a preferred aspect of the invention, the standard obstacle block 5 is a concave obstacle, consisting of a concave obstacle block 1, a tri-axial force sensor 2, a sensor pedestal 3 and a groove 5, and characterized in that the groove 5 is located on the road surface 4; the sensor pedestal 3 is mounted at the bottom of the groove 5; one end of the tri-axial force sensor 2 is mounted on the upper surface of the sensor pedestal 3 and the other end is mounted on the lower surface of the convex obstacle block 1; the cross section of the concave obstacle block 1 along the length direction of the groove 5 has a trapezoidal recess; and, the concave obstacle block 1 is arranged such that the bottom side of the recessed trapezoid is aligned with the road surface after mounting; and the concave obstacle block 1 is selected from one of: (A) the length of long bottom side and the length of short bottom side of the isosceles trapezoid portion of the cross section of the concave obstacle block 1 along the length direction of the groove 5 are 1400 mm and 100 mm, respectively, the height of the trapezoid is 100 mm, and the width of the top portion of the concave obstacle block 1 is 1600 mm; (B) the length of long bottom side and the length of short bottom side of the isosceles trapezoid portion of the cross section of the concave obstacle block 1 along the length direction of the groove 5 are 1200 mm and 80 mm, respectively, the height of the trapezoid is 80 mm, and the width of the top portion of the concave obstacle block 1 is 1400 mm; (C) the length of long bottom side and the length of short bottom side of the isosceles trapezoid portion of the cross section of the concave obstacle block 1 along the length direction of the groove 5 are 1500 mm and 120 mm, respectively, the height of the trapezoid is 120 mm, and the width of the top portion of the concave obstacle block 1 is 1800 mm.

In various technical solutions of the invention, unless otherwise indicated, the mounting road surface 1004 of convex obstacle block and the mounting road surface 1104 of concave obstacle block are the road surface 3 in the system.

The method for simulating real impact test of vehicle wheels of the invention has the advantages that: the need for testing various types of wheels using one set of equipment can be satisfied by using a general type collision trolley, thereby avoiding the use of a corresponding real vehicle for each type of wheels in the test. This greatly reduces the test cost, ensures that the test condition is similar to the real vehicle condition, and can well simulate the performance of a real vehicle when meeting an obstacle.

BRIEF DESCRIPTION OF THE DRAWINGS

The embodiments of the invention will be described below in details with reference to the drawings, wherein.

Figure 1:
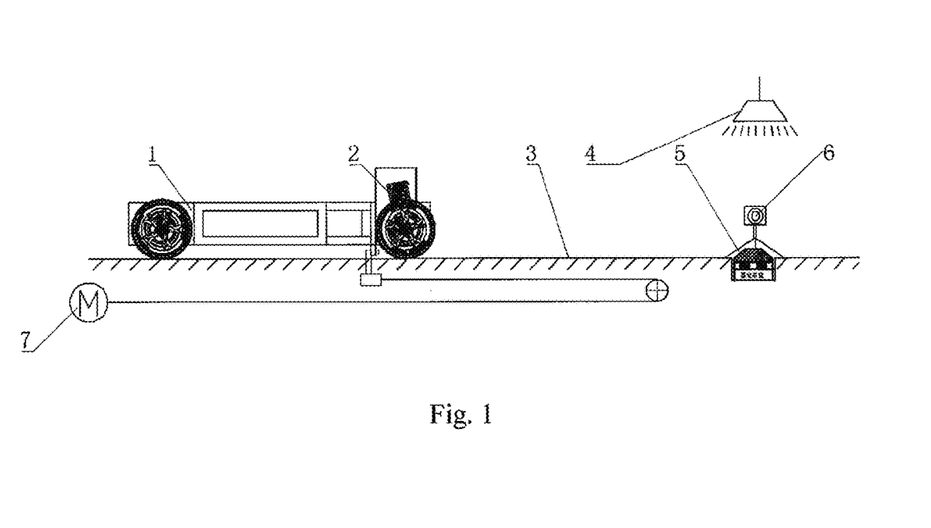
FIG. 1 is a schematic view of the constitution of the system for simulating real impact test of vehicle wheels of example 1 of the invention.
Figure 2:
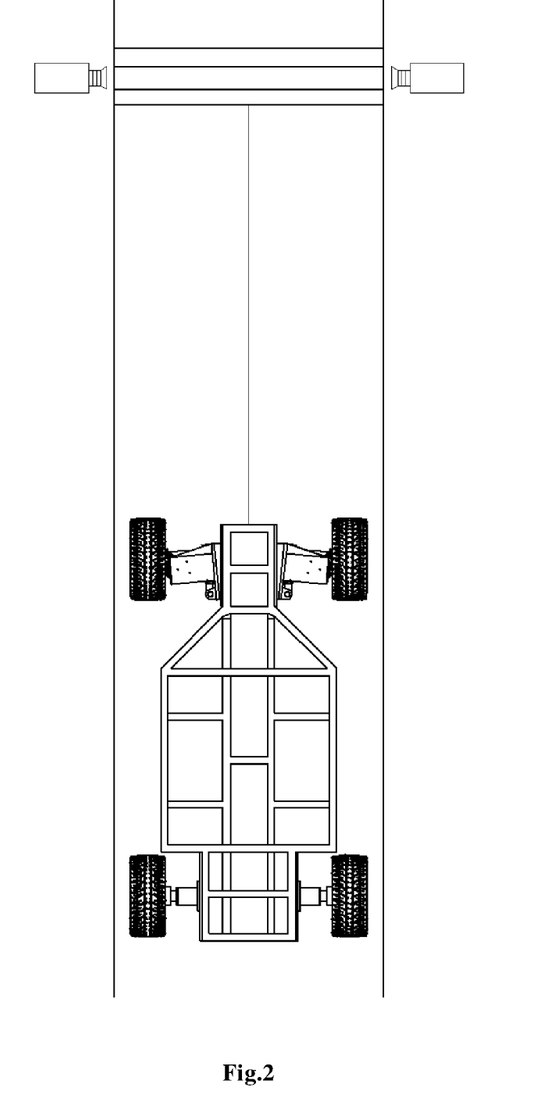
FIG. 2 is a top view of the system for simulating real impact test of vehicle wheels of example 1 of the invention.
Figure 3:
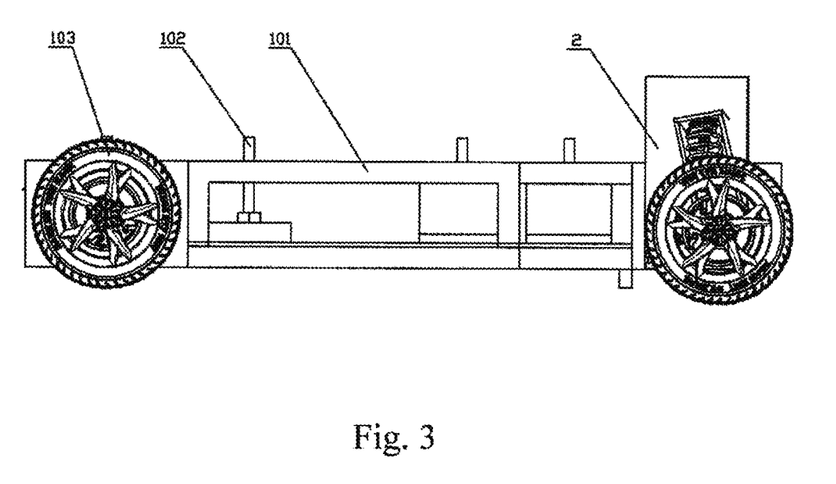
FIG. 3 is a side view of the collision trolley of example 1 of the invention.
Figure 4:
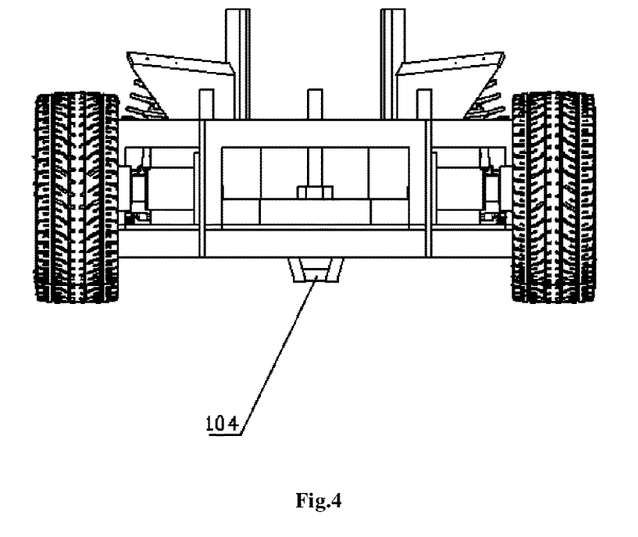
FIG. 4 is a rear view of the collision trolley of example 1 of the invention.
Figure 5:
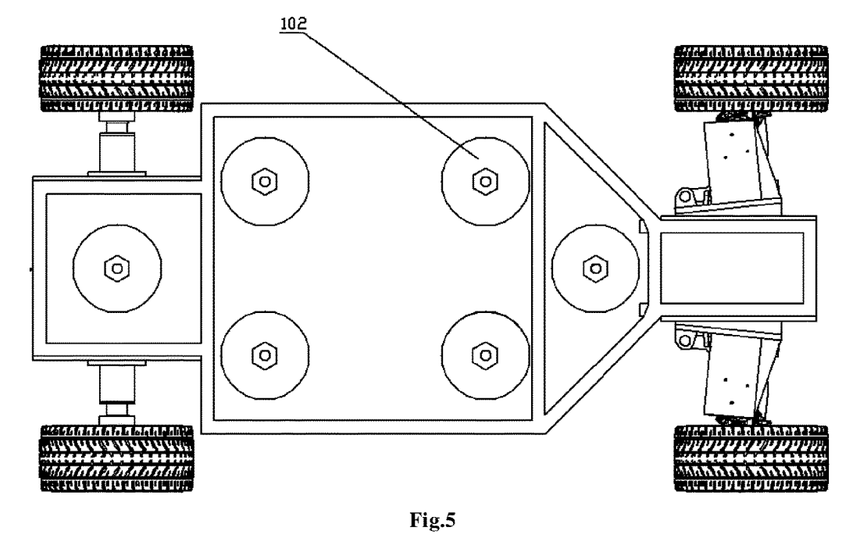
FIG. 5 is a top view of the collision trolley of example 1 of the invention.
Figure 6:
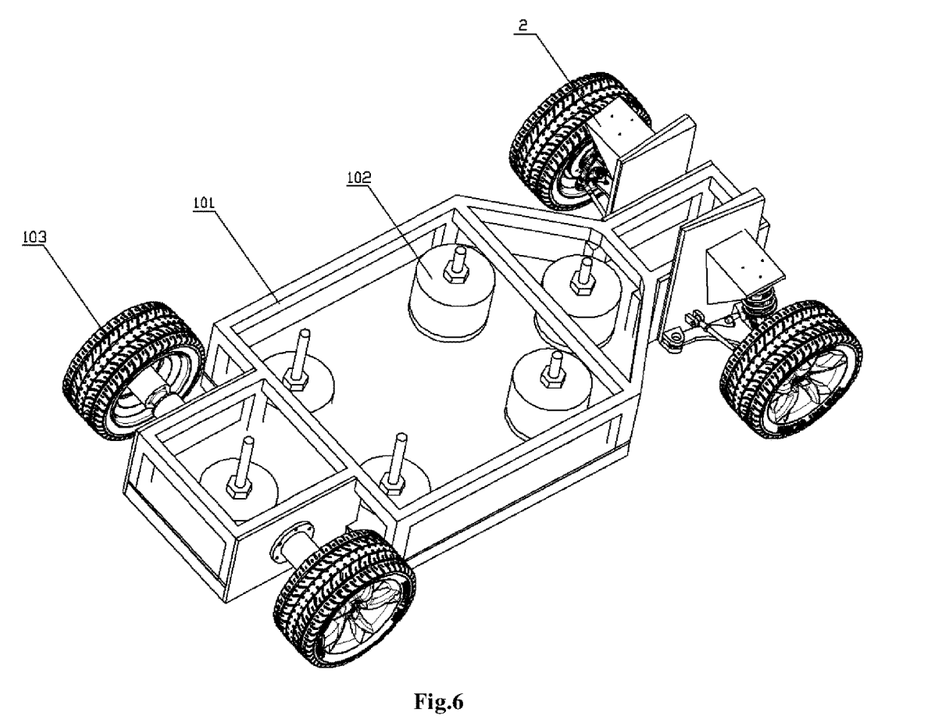
FIG. 6 is a perspective view of the collision trolley of example 1 of the invention.
Figure 7:
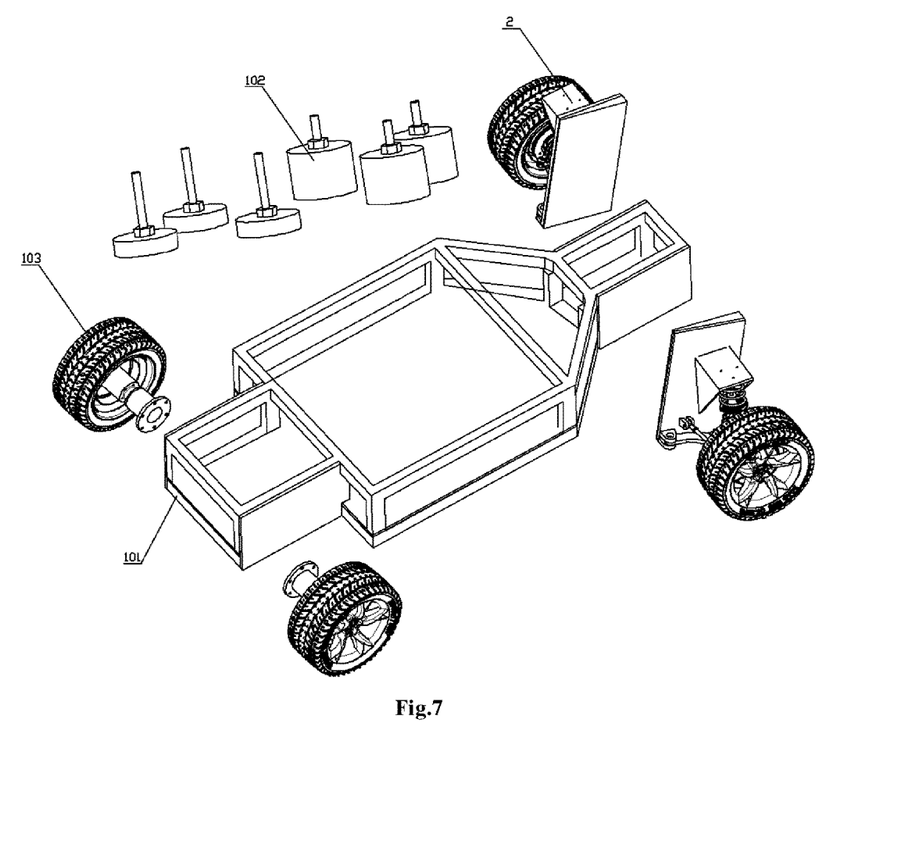
FIG. 7 is a view of the collision trolley of example 1 of the invention in a three-dimensional assembly state.

In the FIG. 1—collision vehicle assembly, 2—tested real vehicle wheel and suspension system, 3—road surface, 4—high-frequency lighting facility, 5—standard obstacle block, 6—high-speed camera, 7—traction motor and wire cable, 101—trolley body, 102—weight and fixation device, 103—rear wheel and axle assembly, 104—traction hook adapting mechanism, 202—hub bearing, 203—steering knuckle, 204—damper and spring, 205—steering drag rod, 206—control arm, 207—suspension fixation backboard, 1001—convex obstacle block, 1002—triaxial force sensor, 1003—sensor pedestal, 1004—mountnig road surface of convex obstacle block, 1005—groove of convex obstacle block, 1101—concave obstacle block, 1102—triaxial force sensor, 1103—sensor pedestal, 1104—mountnig road surface of concave obstacle block, and 1105—groove of concave obstacle block.

DETAILED DESCRIPTION OF THE INVENTION

Example 1 Vehicle and System for Simulating Real Impact Test of Vehicle Wheels In this example, in FIG. 1, the individual system units constitute the equipment for simulating real impact test of the wheel and suspension system, essentially consisting of a collision vehicle assembly 1, a tested real vehicle wheel and suspension system 2, a standard 50 m-200 m runway 3, a high-frequency lighting facility 4, a standard obstacle block 5, a high-speed camera 6 and a traction motor and wire cable 7.

As shown in the schematic view, the assembly of collision trolley and wheel and suspension system consists of a trolley body 101, a weight and fixation device 102, a rear wheel and axle assembly 103, a traction hook adapting mechanism 104 and a wheel suspension system 2.

The trolley body 101 is welded from square tube steel with a steel plate being disposed at the bottom, and six holes for holding weight fixation rods are disposed on the steel plate. In the actual test, by adjusting the number of weights on each weight fixation rod, the vehicle front wheel load and rear wheel load and the vehicle center-of-gravity position are accurately controlled and adjusted. The traction hook adapting mechanism 104 is disposed at the bottom of the trolley body. The weight and fixation device 102 consists of weights, fixation rods and locking nuts. Wherein each weight is a cylinder of 400 mm diameter and 50 mm thickness, with a through-hole of 60 mm diameter at the middle. The fixation rod is a M48 threaded rod of 500 mm length, and the bottom end of the fixation rod is threadedly fixed onto the bottom of the trolley body. The locking nut is a self-made M48 external hexagonal nut.

The rear wheel and axle assembly 103 consists of rear wheels and an axle assembly, and is tightened onto the trolley body via bolts. The wheels and tires may be optional (because the test is for the purpose of front wheel evaluation, in which the rear wheels just assist in driving), and the axles are self-made.

Figure 8:
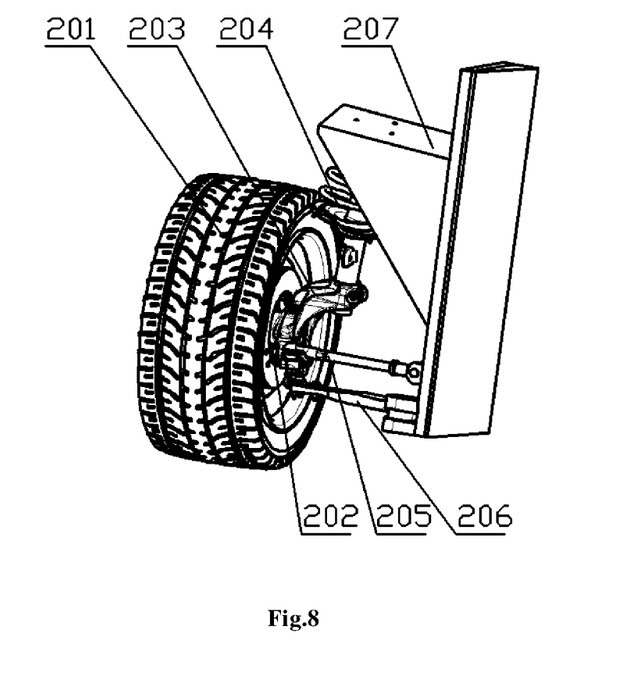
FIG. 8 is a schematic view of the structure of the tested real vehicle wheel and suspension system 2 of example 1 of the invention.
Figure 9:
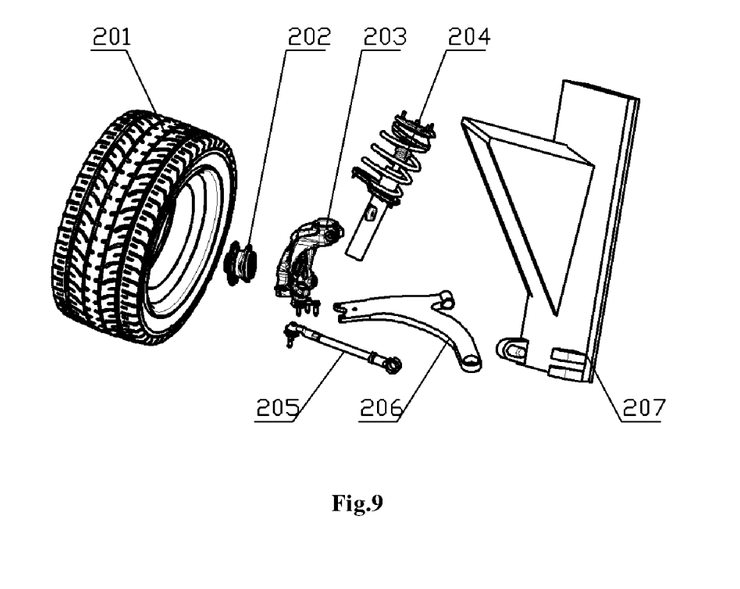
FIG. 9 is a schematic view of assembly of the tested real vehicle wheel and suspension system 2 of example 1 of the invention.

The wheel and suspension system assembly consists of the tested wheel tire 201, the hub bearing 202, the steering knuckle 203, the damper and spring 204, the steering drag rod 205, the control arm 206 and the suspension fixation backboard 207.

The hub bearing 202, the steering knuckle 203, the damper and spring 204, the steering drag rod 205 and the control arm 206 are all original parts of 2015 Volkswagen Golf 1.4T vehicles, purchased from the local auto parts center.

Specifically, the connection is as follows: the steering knuckle 203 is assembled with the damper and spring 204, the steering drag rod 205, the control arm 206 and the suspension fixation backboard 207 according to the actual vehicle assembly mode to form the suspension system, the hub bearing is mounted onto the steering knuckle in the same mode as the real vehicle assembly. The tested wheel is assembled with the original tire for vehicle assembly and inflated until the tire pressure is 200 kPa, then fixed onto the hub bearing via bolts, which is the same as the real vehicle assembly.

Example 2 Simulated Impact Test of Vehicle Wheels

This example is implemented by the following steps:
1. Determination of test needs. The simulating real impact test involves a left front wheel of 2015 Volkswagen Golf 1.4T vehicle meeting a convex obstacle on a road surface at 64 km/h,
2. Determination of test parameters. impact speed=64 kM/h; tire=205/55R16; tire pressure=200 kPa; in the case of full load, the front axle weight is 900 kg, the rear axle weight is 820 kg.
3. Preparation of the suspension assembly. Suspension parts for Golf vehicle type, such as hub bearings, steering knuckles, dampers and helical springs, steering drag rods and control arms, are commercially available. The suspension fixation backboard is designed and made according to the real vehicle assembly parameters. These parts are assembled in the mode equivalent to the real vehicle suspension assembly, to form the suspension system for the tested trolley.
4. Assembly of the suspension and trolley body. The assembled suspension system is fixed onto the trolley body via the bolt holes on the backboard,
5. Assembly of the brand-new test wheel tire sample, inflation and dynamic balance. The wheel-tire assembly is mounted onto the hub bearing of the suspension system in the same mode as the real vehicle assembly.
6. Correction of front wheel alignment in the test trolley mounted with the front wheel and suspension system to enable it to make linear movement.
7. Movement of the trolley to the departure zone and connection with the traction hook.
8. Arrangement of lighting and imaging systems to ensure normal operation of them during of collision of the trolley.
9. Traction of the trolley via the hook by the traction system, with the speed being accelerated to 64 km/h.
10. Imaging via the high-speed camera when the wheel passes through the obstacle block and then deceleration to stop. 11. Detection of wheel deformation.

Figure 11:
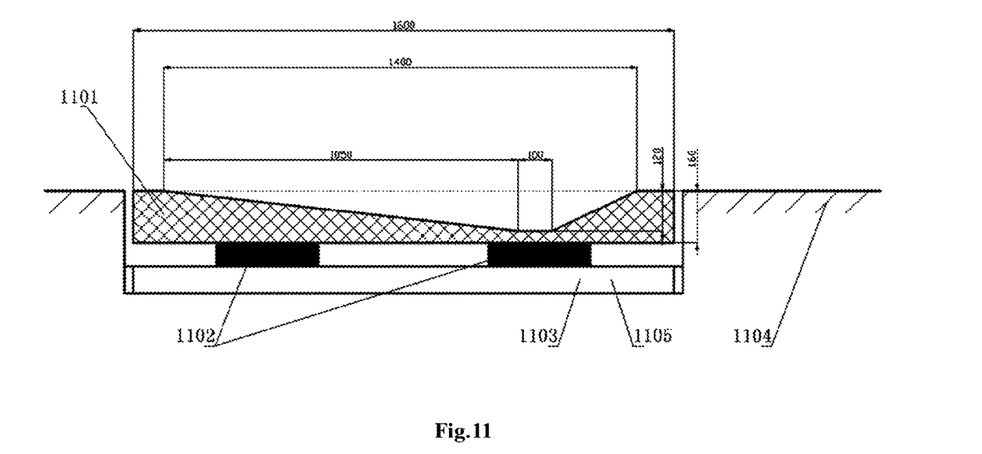
FIG. 11 is a schematic view of the structure of the concave obstacle of example 2 of the invention.

Wherein, the fixed obstacle is selected from a concave obstacle and a convex obstacle. The concave obstacle consists of a concave obstacle block 1101, tri-axial force sensors 1102, a sensor pedestal 1103 and a groove of concave obstacle block 1105, characterized in that the groove of concave obstacle block 1105 is located on a mounting road surface of concave obstacle block 1104; the sensor pedestal 1103 is mounted at the bottom of the groove of concave obstacle block 1105; one end of each tri-axial force sensor 1102 is mounted on the upper surface of the sensor pedestal 1103 and the other end is mounted on the lower surface of the concave obstacle block 1101; the cross section of the concave obstacle block 1101 along the length direction of the groove of concave obstacle block 1105 has a trapezoidal recess; and, the concave obstacle block 1101 is arranged such that the bottom side of the recessed trapezoid is aligned with the mounting road surface of concave obstacle block 1104 after mounting; the length of long bottom side and the length of short bottom side of the isosceles trapezoid portion of the cross section of the concave obstacle block 1101 along the length direction of the groove of concave obstacle block 1105 are 1400 mm and 100 mm, respectively, the height of the trapezoid is 120 mm, and the width of the top portion of the concave obstacle block 1101 is 1600 mm. In the recess on the road, the obstacle, tri-axial force sensors and sensor pedestal are fixed according to the above connection mode, the trolley passes through the obstacle at a certain speed, a mechanical curve of impact process is obtained via the four tri-axial force sensors that are disposed at the bottom of the obstacle and connected to a high-speed digital collector, and a resultant force on the obstacle, i.e. impact force, is calculated by mathematical coupling of the four sensors.

Figure 10:
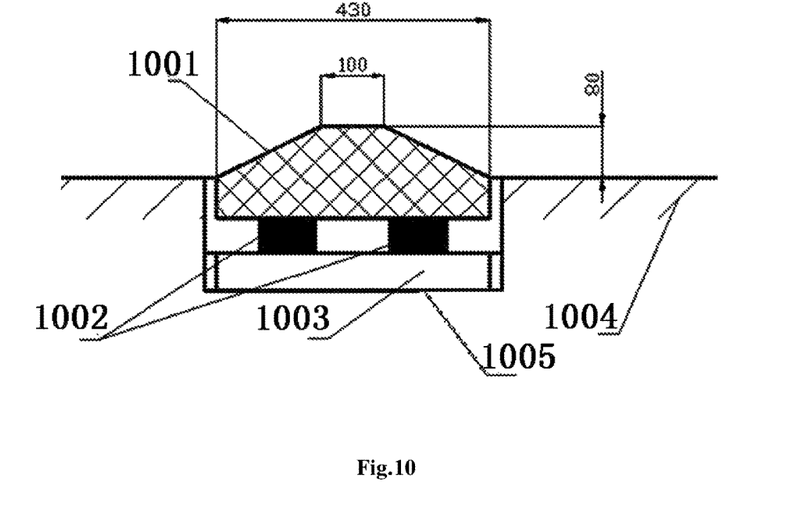
FIG. 10 is a schematic view of the structure of the convex obstacle of example 2 of the invention.

The convex obstacle consists of a convex obstacle block 1001, tri-axial force sensors 1002, a sensor pedestal 1003 and a groove of convex obstacle block 1005, characterized in that the groove of convex obstacle block 1005 is located on a mounting road surface of convex obstacle block 1004; the sensor pedestal 1003 is mounted at the bottom of the groove of convex obstacle block 1005; one end of each tri-axial force sensor 2 is mounted on the upper surface of the sensor pedestal 1003 and the other end is mounted on the lower surface of the convex obstacle block 1001; the upper portion of the cross section of the convex obstacle block 1001 along the length direction of the groove of convex obstacle block 1005 is a trapezoid; and, the convex obstacle block 1001 is arranged such that the bottom side of the trapezoid is aligned with the road surface after mounting; The length of long bottom side and the length of short bottom side of the isosceles trapezoid portion of the cross section of the convex obstacle block 1001 along the length direction of the groove of convex obstacle block 1005 are 430 mm and 100 mm, respectively, and the height of the trapezoid is 80 mm. The lower portion of the cross section of the convex obstacle block 1001 along the length direction of the groove of convex obstacle block 1005 is a rectangle, and the dimension of the rectangle is 430×70 mm. In the recess on the road, the obstacle, tri-axial force sensors and sensor pedestal are fixed according to the above connection mode. The trolley passes through the obstacle at a certain speed, a mechanical curve of impact process is obtained via the four tri-axial force sensors that are disposed at the bottom of the obstacle and connected to a high-speed digital collector, and a resultant force on the obstacle is calculated by mathematical coupling of the four sensors.

Comparative Example 1: Bench Test of Wheels

A wheel of the same specification as the one in example 2 is selected, a tire 205/55R16 is assembled with the wheel and inflated, followed by the 90° impact test that is performed according to the method listed in the industry standard QC/T991-2015, with E2 energy level. The test results show that the maximum impact force on the wheel is 56.1 KN, and the wheel rim deformation is 8.63 mm.

Comparative Example 2: Real Vehicle Test of Wheels

The simulating real impact test involves a left front wheel of 2015 Volkswagen Golf 1.4T vehicle meeting a convex obstacle on a road surface at 80 km/h. For safety purpose, an anti-rolling rack is mounted inside the vehicle body, and a test driver should wear safety clothing and helmets. The convex standard obstacle block is placed on the test road surface. The front axle weight is adjusted to 900 kg and the rear axle weight is 820 kg. The vehicle is driven at 64 km/h, and when the left front wheel passes through the standard obstacle block, the impact force detected is 37.7 kN. The wheel is disassembled after the impact test is completed for deformation detection, and the result shows that the wheel rim deformation is 1.1 mm.

Example 3: Wheel Deformation Test Results

As the same standard obstacle block is selected in example 2 and comparative examples 1-2, they are comparable. Based on the comparison of test data from example 2 and comparative examples 1-2, as shown in Table 1, it is found that the impact test results of the simulated real vehicle impact system (example 2) are more close to the actual results (comparative example 1) than the bench test (comparative example 1).

TABLE 1

Test results of example 2 and comparative examples 1-2

| Test group | Detected impact force (KN) | detected deformation (mm) |
| --- | --- | --- |
| Example 2 | 36.0 | 1.5 |
| Comparative example 1 | 56.1 | 8.63 |
| Comparative example 2 | 37.7 | 1.1 |

It can be seen from the test results that: there is a significant difference between the bench test and the real vehicle test, mainly because the vehicle suspension system cannot be used in the bench test and thus the impact force is completely absorbed by the wheel alone. While in example 2, as the wheels and the suspension system are mounted on the same one simulated vehicle in the mode equivalent to the real vehicle assembly, the effect of impact test is very close to the actual vehicle impact condition of comparative example 2.

The invention claimed is:
1. A method for simulating real impact test of vehicle wheels, wherein the method is implemented using a vehicle used in wheel simulating real impact test, a road surface, a high-frequency lighting facility, a standard obstacle block, a high-speed camera, and a traction motor and steel cable; the traction motor of the traction motor and steel cable is fixed to the first end of the road surface and fixed to the first end of the steel cable, the other end of the steel cable is fixed to a traction hook adapting mechanism of the vehicle used in wheel simulating real impact test; the foregoing vehicle used in wheel simulating real impact test is located at the first end of the road surface; the standard obstacle block is fixed to the second end of the road surface; the high-speed camera is mounted on the lateral side of the road surface and above the standard obstacle block; the high-frequency lighting facility is mounted above the standard obstacle block;

the vehicle used in wheel simulating real impact test comprises a collision vehicle assembly and a tested real vehicle wheel and a suspension system, the collision vehicle assembly includes a trolley body, a weight and fixation device, a rear wheel and axle assembly and a traction hook adapting mechanism; the weight and fixation device is disposed at the middle part of the trolley body, the tested real vehicle wheel and suspension system is mounted at the front part of the trolley body, the rear wheel and axle assembly is mounted at the rear part of the trolley body, and the traction hook adapting mechanism is fixed at the bottom of the trolley body; and the method includes the following steps: (A) assembling a hub bearing, a steering knuckle, a damper and spring, a steering drag rod and a control arm to the real vehicle wheel and suspension system under the assembly conditions of a real vehicle corresponding to a to-be-tested wheel tire, and fixing to the trolley body via a suspension fixation backboard; (B) fixing weights at the front, middle and rear parts of the trolley body according to the weight of the real vehicle corresponding to the to-be-tested wheel tire, to form the weight and fixation device; (C) performing front wheel alignment correction on the mounted vehicle used in wheel simulating real impact test, to ensure that the vehicle is driven by the traction motor and steel cable to make linear movement; (D) moving the mounted vehicle used in wheel simulating real impact test to the first end of the road surface and fixing to the traction motor and steel cable; (E) arranging the standard obstacle block on the road surface; (F) turning on the high-frequency lighting facility and the high-speed camera;

(G) towing the vehicle used in wheel simulating real impact test using the traction motor and steel cable; (H) taking images by the high-speed camera when the wheel passes through the obstacle block, and then decelerating to stop; (I) detecting the wheel deformation.

2. The method according to claim 1, wherein the trolley body is welded from square tube steel with a steel plate being disposed at the bottom.

3. The method according to claim 2, wherein the tested real vehicle wheel and suspension system includes a tested wheel tire, a hub bearing, a steering knuckle, a damper and spring, a steering drag rod, a control arm and a suspension fixation backboard; the tested wheel tire, the hub bearing, the steering knuckle, the damper and spring, the steering drag rod and the control arm are assembled in the real vehicle assembly mode; the control arm and the damper and spring are fixed to the suspension fixation backboard, respectively; and the suspension fixation backboard is fixed to the trolley body.

4. The method according to claim 2, wherein the hub bearing, the steering knuckle, the damper and spring, the steering drag rod and the control arm are components for real vehicle assembly of the to-be-tested real vehicle wheel.

5. The method according to claim 2, wherein in step (F), the traction enables the velocity of the vehicle used in wheel simulating real impact test to be 40-80 km/h.

6. The method according to claim 2, wherein the traction enables the velocity of the vehicle used in wheel simulating real impact test to be 64 kM/h, the tire used is of type 205/55R16, the tire pressure of the tire is 200 kPa, and in the case of full load, the front axle weight is 900 kg and the rear axle weight is 820 kg.

7. The method according to claim 2, wherein the standard obstacle block is a convex obstacle, comprising of a convex obstacle block, a tri-axial force sensor, a sensor pedestal and a groove, and wherein the groove is located on the road surface; the sensor pedestal is mounted at the bottom of the groove; one end of the tri-axial force sensor is mounted on the upper surface of the sensor pedestal and the other end is mounted on the lower surface of the convex obstacle block; the upper portion of the cross section of the convex obstacle block along the length direction of the groove is a trapezoid; and, the convex obstacle block is arranged such that the bottom side of the trapezoid is aligned with the road surface after mounting; and the convex obstacle block is selected from one of: (A) the length of long bottom side and the length of short bottom side of the isosceles trapezoid portion of the cross section of the convex obstacle block along the length direction of the groove are 430 mm and 100 mm, respectively, the height of the trapezoid is 80 mm, and the lower portion of the cross section of the convex obstacle block along the length direction of the groove is a rectangle, and the dimension of the rectangle is 430×70 mm; (B) the length of long bottom side and the length of short bottom side of the isosceles trapezoid portion of the cross section of the convex obstacle block along the length direction of the groove are 400 mm and 80 mm, respectively, the height of the trapezoid is 50 mm, and the lower portion of the cross section of the convex obstacle block along the length direction of the groove is a rectangle, and the dimension of the rectangle is 400×50 mm; (C) the convex obstacle block is selected from one of: (A) the length of long bottom side and the length of short bottom side of the isosceles trapezoid portion of the cross section of the convex obstacle block along the length direction of the groove are 450 mm and 130 mm, respectively, the height of the trapezoid is 90 mm, and the lower portion of the cross section of the convex obstacle block along the length direction of the groove is a rectangle, and the dimension of the rectangle is 450×90 mm.

8. The method according to claim 2, wherein the standard obstacle block is a concave obstacle, comprising of a concave obstacle block, a tri-axial force sensor, a sensor pedestal and a groove, and wherein the groove is located on the road surface; the sensor pedestal is mounted at the bottom of the groove; one end of the tri-axial force sensor is mounted on the upper surface of the sensor pedestal and the other end is mounted on the lower surface of the concave obstacle block;

the cross section of the concave obstacle block along the length direction of the groove has a trapezoidal recess; and, the concave obstacle block is arranged such that the bottom side of the recessed trapezoid is aligned with the road surface after mounting; the concave obstacle block is selected from one of: (A) the length of long bottom side and the length of short bottom side of the isosceles trapezoid portion of the cross section of the concave obstacle block along the length direction of the groove are 1400 mm and 100 mm, respectively, the height of the trapezoid is 100 mm, and the width of the top portion of the concave obstacle block is 1600 mm; (B) the length of long bottom side and the length of short bottom side of the isosceles trapezoid portion of the cross section of the concave obstacle block along the length direction of the groove are 1200 mm and 80 mm, respectively, the height of the trapezoid is 80 mm, and the width of the top portion of the concave obstacle block is 1400 mm; (C) the length of long bottom side and the length of short bottom side of the isosceles trapezoid portion of the cross section of the concave obstacle block along the length direction of the groove are 1500 mm and 120 mm, respectively, the height of the trapezoid is 120 mm, and the width of the top portion of the concave obstacle block is 1800 mm.

9. The method according to claim 1, wherein the weight and fixation device includes weights fixed to the front, middle and rear parts of the trolley body, and the weights fixed to the front, middle and rear parts of the trolley body are 50-200 kg, 50-400 kg and 50-200 kg, respectively.

10. The method according to claim 1, wherein each weight in the weight and fixation device is a cylinder of 400 mm diameter and 50 mm thickness, with a through-hole of 60 mm diameter at the middle; each weight is fixed to the trolley body via a fixation rod, and the fixation rod is a M48 threaded rod of 500 mm length; and the bottom end of the fixation rod is threadedly fixed onto the bottom of the trolley body.

11. The method according to claim 1, wherein the tested real vehicle wheel and suspension system includes a tested wheel tire, a hub bearing, a steering knuckle, a damper and spring, a steering drag rod, a control arm and a suspension fixation backboard; the tested wheel tire, the hub bearing, the steering knuckle, the damper and spring, the steering drag rod and the control arm are assembled in the real vehicle assembly mode; the control arm and the damper and spring are fixed to the suspension fixation backboard, respectively; and the suspension fixation backboard is fixed to the trolley body.

12. The method according to claim 1, wherein the hub bearing, the steering knuckle, the damper and spring, the steering drag rod and the control arm are components for real vehicle assembly of the to-be-tested real vehicle wheel.

13. The method according to claim 1, wherein in step (F), the traction enables the velocity of the vehicle used in wheel simulating real impact test to be 40-80 km/h.

14. The method according to claim 1, wherein the traction enables the velocity of the vehicle used in wheel simulating real impact test to be 64 kM/h, the tire used is of type 205/55R16, the tire pressure of the tire is 200 kPa, and in the case of full load, the front axle weight is 900 kg and the rear axle weight is 820 kg.

15. The method according to claim 1, wherein the standard obstacle block is a convex obstacle, comprising of a convex obstacle block, a tri-axial force sensor, a sensor pedestal and a groove, and wherein the groove is located on the road surface; the sensor pedestal is mounted at the bottom of the groove; one end of the tri-axial force sensor is mounted on the upper surface of the sensor pedestal and the other end is mounted on the lower surface of the convex obstacle block; the upper portion of the cross section of the convex obstacle block along the length direction of the groove is a trapezoid; and, the convex obstacle block is arranged such that the bottom side of the trapezoid is aligned with the road surface after mounting; and the convex obstacle block is selected from one of: (A) the length of long bottom side and the length of short bottom side of the isosceles trapezoid portion of the cross section of the convex obstacle block along the length direction of the groove are 430 mm and 100 mm, respectively, the height of the trapezoid is 80 mm, and the lower portion of the cross section of the convex obstacle block along the length direction of the groove is a rectangle, and the dimension of the rectangle is 430×70 mm; (B) the length of long bottom side and the length of short bottom side of the isosceles trapezoid portion of the cross section of the convex obstacle block along the length direction of the groove are 400 mm and 80 mm, respectively, the height of the trapezoid is 50 mm, and the lower portion of the cross section of the convex obstacle block along the length direction of the groove is a rectangle, and the dimension of the rectangle is 400×50 mm; (C) the convex obstacle block is selected from one of: (A) the length of long bottom side and the length of short bottom side of the isosceles trapezoid portion of the cross section of the convex obstacle block along the length direction of the groove are 450 mm and 130 mm, respectively, the height of the trapezoid is 90 mm, and the lower portion of the cross section of the convex obstacle block along the length direction of the groove is a rectangle, and the dimension of the rectangle is 450×90 mm.

16. The method according to claim 1, wherein the standard obstacle block is a concave obstacle, comprising of a concave obstacle block, a tri-axial force sensor, a sensor pedestal and a groove, and wherein the groove is located on the road surface; the sensor pedestal is mounted at the bottom of the groove; one end of the tri-axial force sensor is mounted on the upper surface of the sensor pedestal and the other end is mounted on the lower surface of the concave obstacle block;

the cross section of the concave obstacle block along the length direction of the groove has a trapezoidal recess; and, the concave obstacle block is arranged such that the bottom side of the recessed trapezoid is aligned with the road surface after mounting; the concave obstacle block is selected from one of: (A) the length of long bottom side and the length of short bottom side of the isosceles trapezoid portion of the cross section of the concave obstacle block along the length direction of the groove are 1400 mm and 100 mm, respectively, the height of the trapezoid is 100 mm, and the width of the top portion of the concave obstacle block is 1600 mm; (B) the length of long bottom side and the length of short bottom side of the isosceles trapezoid portion of the cross section of the concave obstacle block along the length direction of the groove are 1200 mm and 80 mm, respectively, the height of the trapezoid is 80 mm, and the width of the top portion of the concave obstacle block is 1400 mm; (C) the length of long bottom side and the length of short bottom side of the isosceles trapezoid portion of the cross section of the concave obstacle block along the length direction of the groove are 1500 mm and 120 mm, respectively, the height of the trapezoid is 120 mm, and the width of the top portion of the concave obstacle block is 1800 mm.

17. The method according to claim 2, wherein each weight in the weight and fixation device is a cylinder of 400 mm diameter and 50 mm thickness, with a through-hole of 60 mm diameter at the middle; each weight is fixed to the trolley body via a fixation rod, and the fixation rod is a M48 threaded rod of 500 mm length; and the bottom end of the fixation rod is threadedly fixed onto the bottom of the trolley body.

* * * * *